(12) United States Patent
Soileau

(10) Patent No.: US 6,230,837 B1
(45) Date of Patent: May 15, 2001

(54) TRUE CENTER WIDE DRIVE FOR MOTORCYCLES

(76) Inventor: William Soileau, 19407 Park Row, Suite 104, Houston, TX (US) 77084

( * ) Notice: Subject to any disclaimer, the term of this patent is extended or adjusted under 35 U.S.C. 154(b) by 0 days.

(21) Appl. No.: 09/483,065

(22) Filed: Jan. 14, 2000

Related U.S. Application Data

(60) Provisional application No. 60/116,044, filed on Jan. 14, 1999.

(51) Int. Cl.[7] .................................................. B62K 25/26
(52) U.S. Cl. ............................................................ 180/227
(58) Field of Search .................................. 180/219, 226, 180/227; 280/284, 285, 286

(56) References Cited

U.S. PATENT DOCUMENTS

| | | | |
|---|---|---|---|
| 2,230,749 | * | 2/1941 | Hebert . |
| 4,650,026 | * | 3/1987 | Shiraishi ............................... 180/227 |
| 4,667,762 | * | 5/1987 | Ishino et al. .......................... 180/226 |
| 5,996,718 | | 12/1999 | Desrosiers . |

\* cited by examiner

*Primary Examiner*—Kevin Hurley
(74) *Attorney, Agent, or Firm*—Keeling Law Firm

(57) ABSTRACT

A motorcycle modification kit, primarily for Harley Davidson frames, having an oversized wide swing arm for pivotal mounting to a motorcycle frame for supporting a rear wheel having a wide series rear tire. The invention uses offset spacers for the transmission pulley and brake rotor such that the tire remains aligned along the center line of the motorcycle.

4 Claims, 4 Drawing Sheets

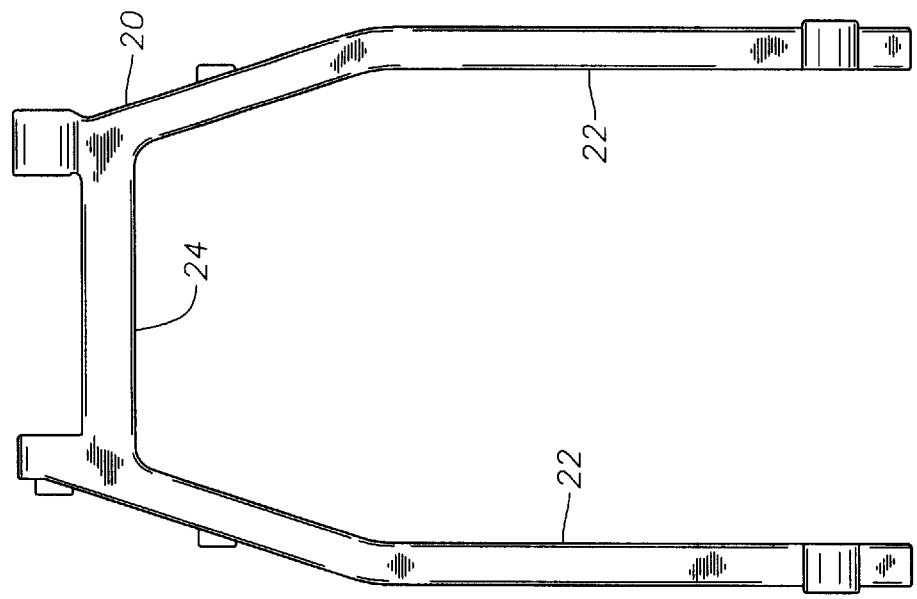
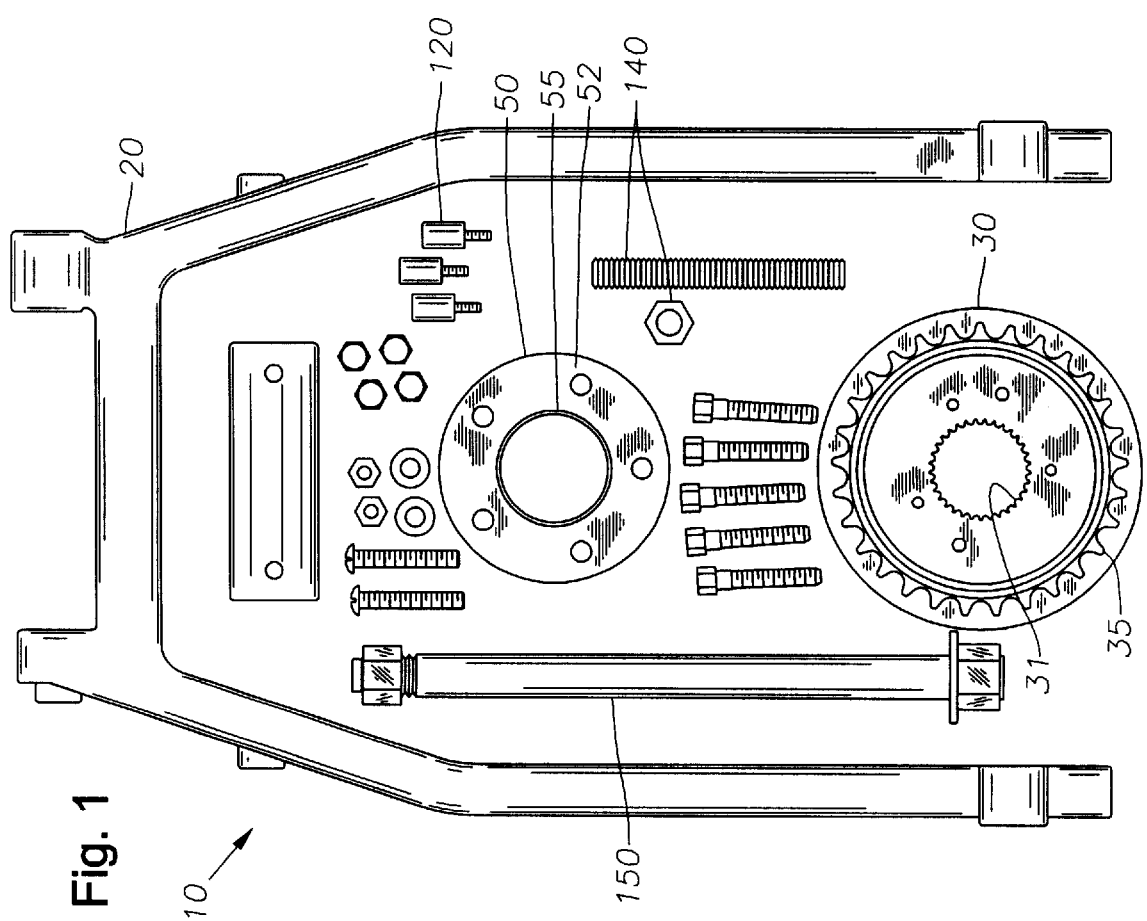

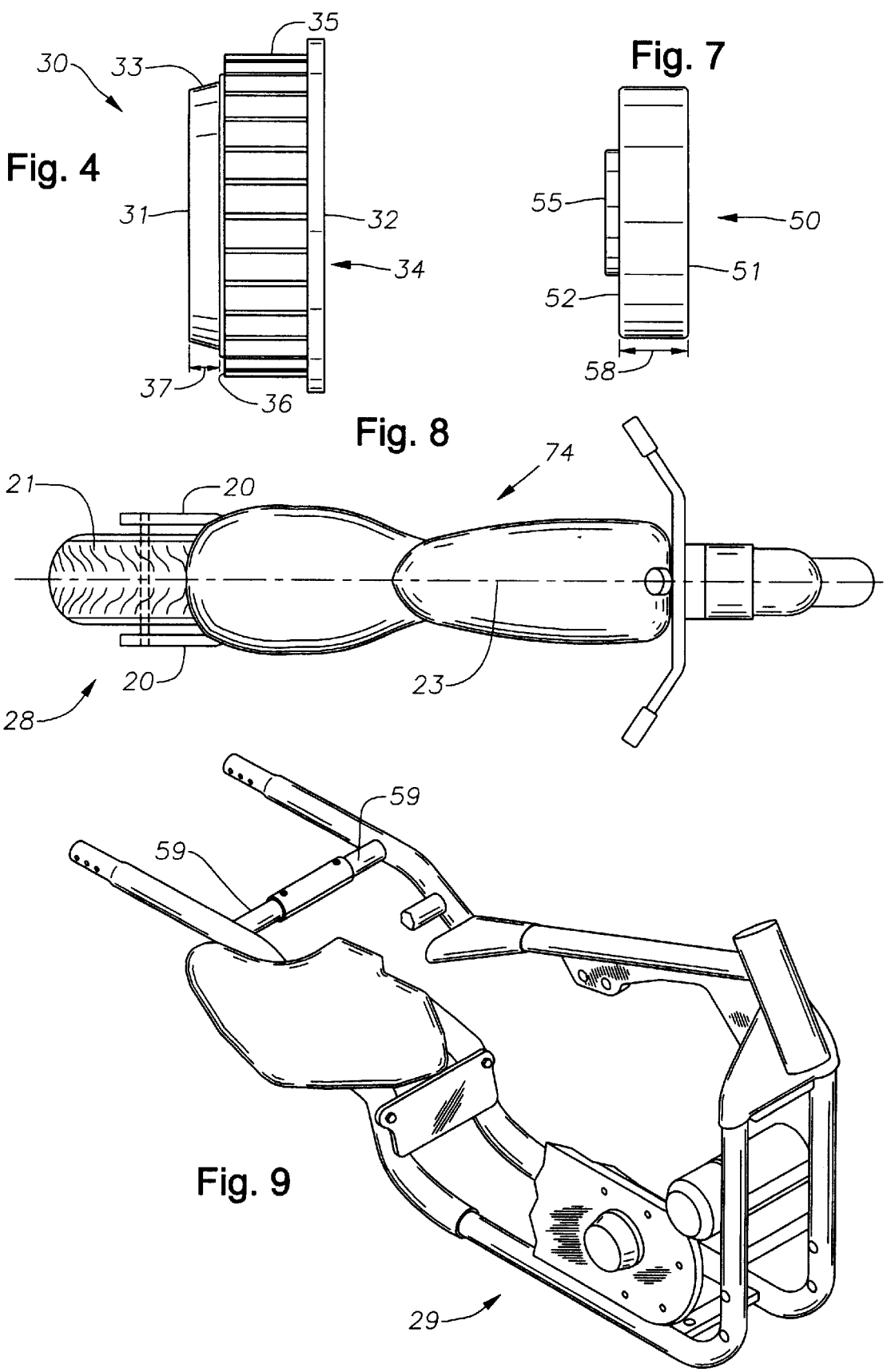

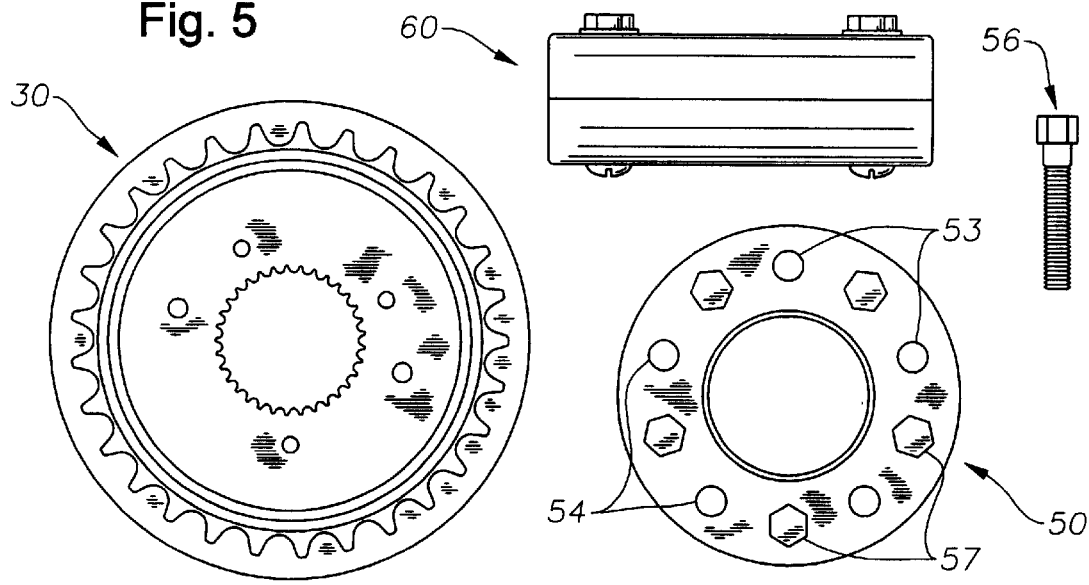
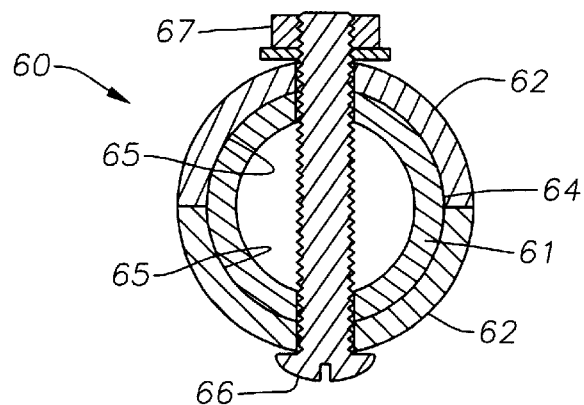
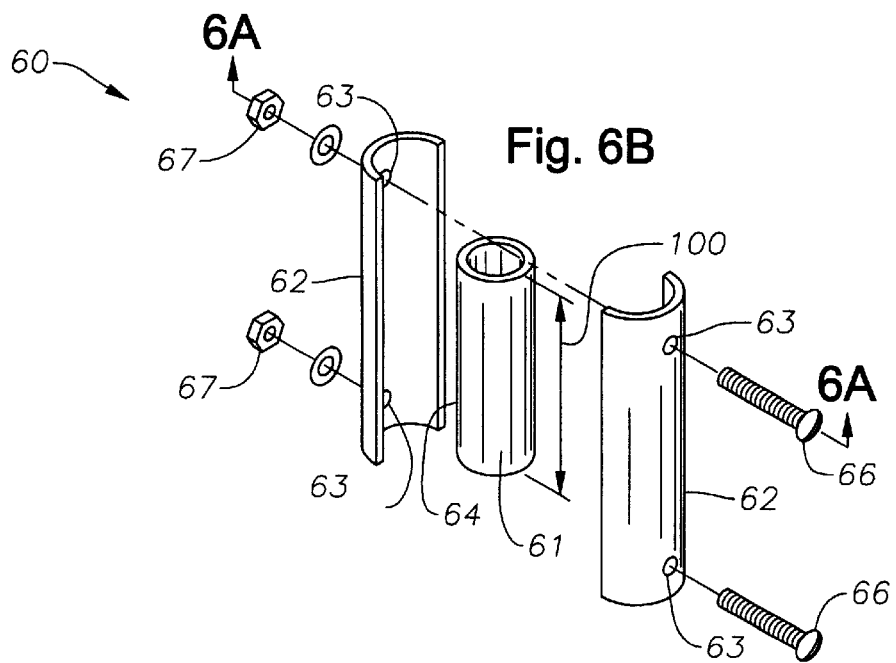

TRUE CENTER WIDE DRIVE FOR MOTORCYCLES

This application claims benefit of Provisional application No. 60/116,044 filed Jan. 14, 1999.

BACKGROUND OF THE INVENTION

1. Field of Invention

This invention relates generally to kits and components thereof for retrofitting motorcycle factory frames with wide rear tires. Specifically, this invention relates to such kits and components for retrofitting such frames with true center wide drives and rear tires.

2. Related Art

It is known in the art of motorcycle maintenance that wider rear tires can be installed by modifying the rear swing arm for the motorcycle's rear wheel. However, these shop modifications are often done to inexact specifications, posing safety hazards. Further, these modifications to the swing arm only do not compensate for misalignment of the rear wheel and tire caused by inherent offset. For example, the Desrosiers 5,996,718 patent discloses a swing arm for customizing the rear wheel of a motorcycle using a triangular shaped swing arm typical to Harley-Davidson Softail™ motorcycles. However, the Desrosiers '718 patent does not compensate for the inherent offset orientation oblique to the motorcycle centerline. This causes the front and rear tires to be aligned on different center lines, resulting in poor stability and balance. It would therefore be a new and useful improvement over prior art for an after-market modification kit to include both a wider rear swing arm for the rear wheel and an offset transmission pullet to move the drive belt/chain outward t allow even swing arm spacing on both sides of the rear tire.

BRIEF DESCRIPTION OF THE DRAWINGS

FIG. 1 is a top view of the drive kit and components.

FIG. 2 is the top view of the wide swing arm.

FIG. 4 is a side view of the offset pulley.

FIG. 5 is a top view of the offset pulley, the strut spacer, and the offset brake rotor spacer.

FIG. 6A is a cross-sectional view of the assembled strut spacer taken along line 6A—6A of FIG. 6B.

FIG. 6B is an exploded view of the strut spacer.

FIG. 7 is a side view of the offset brake rotor spacer.

FIG. 8 is a top view of a motorcycle showing the wider rear tire aligned along the center line of the motorcycle.

FIG. 9 is a cutaway view of the motorcycle transmission and the widened frame cross-member.

DESCRIPTION OF THE INVENTION

Figure 3:
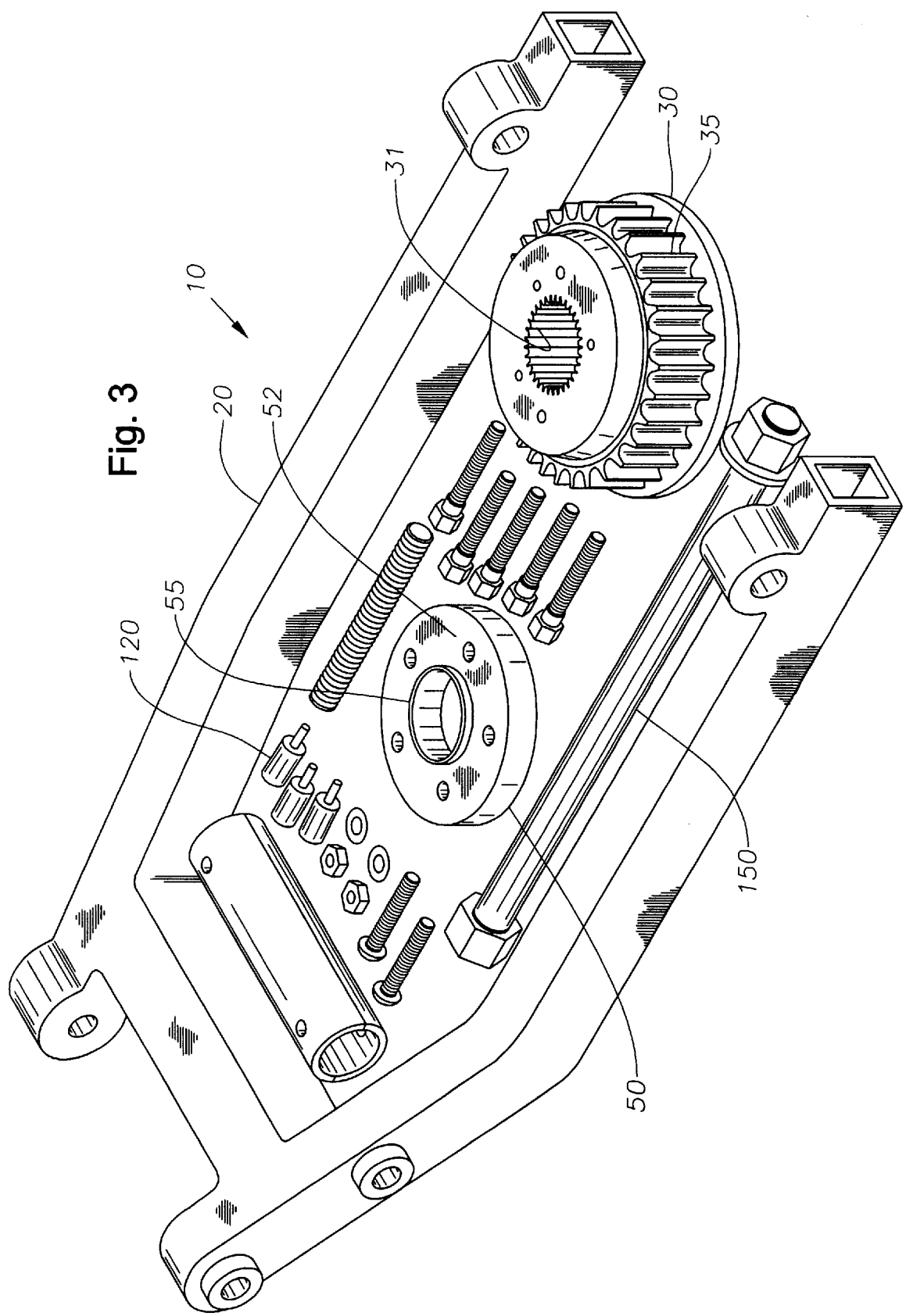
FIG. 3 is an isometric view of the drive kit and components

The True Center Wide Drive for Motorcycles is shown generally in FIG. 1 as 10. The Drive 10 comprises a wide swing arm 20, offset pulley 30, strut spacer 60, and offset brake rotor spacer 50.

The wide swing arm 20 is shown in FIGS. 1, 2, and 3. Wide swing arm 20 comprises two legs 22 joined by a leg connecting member 24. Preferably, leg connecting member 24 is of uniform thickness. Importantly, leg connecting member 24 is wider than the corresponding piece in factory made frames. The wider length enables wider rear tire 21 to be placed inside of the wide wing arm 20. Of course, a wider swing arm 20 will require a longer rear axle 150.

Offset pulley 30 is shown in FIGS. 1, 3, and 4. Offset pulley 30 includes an inner surface 31, an outer surface 32, an offset 33, a main drive gear hole 34, and a transmission sprocket surface 35. Offset pulley 30 is generally cylindrical in shape. Pulley inner surface 31, once installed, is adjacent to the motorcycle's transmission 29 so that pulley outer surface 32 is proximate the exterior of motorcycle 74. Adjacent the pulley inner surface 31 is the offset 33. Intermediate the offset 33 and the pulley outer surface 32 is the transmission sprocket surface 35. The main drive gear hole 34 is located through the pulley inner surface 31 and the offset 33.

In typical pulleys, the corresponding pulley inner surface is flush with the inner side 36 of the transmission sprocket surface 35. Offset pulley 30 includes offset 33 which provides an additional spacing 37 between the inner side 36 and the pulley inner surface 31. Thus, typical pulleys do not include the offset 33 or the additional spacing 37.

Offset pulley 30 may also be adjustable so that offset 33 can be moved in relation to pulley inner surface 31 thereby changing the additional spacing 37. In this embodiment, offset 33, including pulley inner surface 31, can be removed and are separate from the remainder of offset pulley 30. The offset 33 is locked into place to the remainder of the offset pulley 30, thereby also defining a specific spacing 37, by releasable locking means which may comprise set screws, splined, threads, or key ways.

Offset brake rotor spacer 50 is shown in FIGS. 1, 3, 5, and 7. Rotor spacer 50 is annular in shape and includes an inner surface 51 and an outer surface 52 that also defines a spacing 58. Rotor spacer 50 also includes a plurality of countersunk wheel holes 53, a plurality of adapter rotor holes 54, and a lip 55. When attached, rotor spacer inner surface 51 is adjacent to the wider motorcycle tire. A plurality of first bolts 56 are inserted through the countersunk wheel holes 53 and into the original brake rotor bolt holes on rear wheel 28. Thus, the brake rotor spacer 50 is attached to the tire. It is important that the wheel holes 53 be countersunk so that rotor spacer outer surface 52 can fit flush with the rotor. Lip 55 extends outwardly from the rotor spacer outer surface 52 and provides center alignment to the rotor as the tire rotates. The rotor fits flush with rotor spacer outer surface 52. A plurality of bolts 57 are inserted through the original rotor holes and into the plurality of adapter rotor holes 54. Thus, the rotor is attached to the offset brake rotor spacer 50.

It is noted that rotor spacer 50 in FIGS. 1 and 3 includes five holes and that it includes ten holes are included in FIG. 5. For the embodiment of FIGS. 1 and 3, it is understood that holes 54 and holes 53 may comprise the same holes and that bolts 57 and bolts 56 may comprise the same bolts so that such bolts are inserted through the rotor through the rotor spacer and into rear wheel 28. Countersinking is not necessary in this embodiment. FIG. 5 illustrates the embodiment including different holes, 53 and 54, and bolts, 56 and 57.

Strut spacer 60 is shown in FIGS. 5, 6A, 6B and 9. Strut spacer 60 is attached to frame cross-member 59 of the motorcycle. Strut spacer 60 includes an inner cylindrical element 61, and two opposing semi-cylindrical outer elements 62. The two outer elements 62 are identical to each other, and each includes a hole 63 proximate each of its two ends. Inner element 61 and outer elements 62 are sized and constructed so that the inner element 61 can snugly fit within the outer elements 62. In other words, the two outer elements 62 together form a generally cylindrical shape that completely surrounds the inner element 61. When surrounded, the inner element outer surface 64 should abut the inner surface 65 of each outer element 62. The inner element 61 should be shorter in length so that, when the inner element 61 is surrounded by the two outer elements 62, the inner element 61 is located intermediate the holes 63 and does not obstruct such holes 63. In addition, when the inner element 61 is surrounded by the two outer elements 62, the holes 63 on corresponding ends of the two outer elements 62 should align. Once aligned, bolts 66 should be inserted through the holes 63 and should be tightened with nuts 67. Upon tightening, the inner element 61 will be securely held in place within the outer elements 62.

Inner element 61 includes a length 100. Length 100 is the additional width that is necessary to enable the reception of wider rear tire 21 and rear fender by the struts and wide swing arm 20. Essentially, the struts spacer 60 widens the distance between the struts of motorcycle 74 in order to enable wider rear tire 21 and fender to fit. However, once the distance between the struts is widened, several components, including the original rotor, the original pulley, and the original swing arm, of the original drive are also not properly aligned. Thus, the wider swing arm 20, which includes the additional width, is installed instead of the original swing arm. In addition, the offset pulley 30 is installed instead of the original factory pulley. And the rotor spacer 50 is installed in between rear wheel 28 and the rotor.

Drive 10 allows for the centered installation of wider rear tire 21 because [1] the wider swing arm 20 is also centered onto rear wheel 28; and [2] the distance of rotor spacer spacing 58 is substantially equal to the distance of offset spacing 37. Thus, rotor spacer spacing 58 and offset spacing 37 each encompasses one-half of the total additional width necessary to enable the installation of wider rear tire 21. And, because the rotor spacer spacing 58 is at one side of the wider rear tire and the offset spacing 37 is at the other side of wider rear tire 21, equal spacing at each side of wider rear tire 21 is achieved which results on the centering of wider rear tire 21 along center line 23, as shown in FIG. 8.

Other components of motorcycle 74 may also have to be spaced out of their original location in order to allow the insertion of wider rear tire 21. These components include the battery box, which can be offset by the battery box spacers (comprising regular annular spacers with corresponding bolts and nuts); the pulley cover, which can be offset by the pulley cover spacer 120; and the muffler mounting bracket, which can be offset by the muffler bracket nut and bolt spacer 140.

I claim:

1. A true center wide drive for a motorcycle, comprising:

a wide swing arm, an offset pulley, a strut spacer and an offset brake rotor spacer;

said wide swing arm comprising two legs joined by an oversized leg connecting member;

said offset pulley including a pulley inner surface, an offset, a main drive gear hole and a transmission sprocket surface;

said pulley inner surface capable of being oriented between a transmission of said motorcycle and said offset;

said offset being oriented between said pulley inner surface and said transmission sprocket surface;

said offset brake rotor spacer including an inner surface and an outer surface defining a spacing between a wider rear tire of said motorcycle and a brake rotor of said motorcycle;

said strut spacer being attachable to a frame crossmember of said motorcycle for forming an additional width to enable the reception of said wider rear tire;

said wider swing arm capable of being mounted about a rear wheel of said motorcycle;

said rear tire being mounted on said rear wheel, and said rear wheel and said rear tire being centered along a center line of said motorcycle.

2. A true center wide drive for a motorcycle as in claim 1, wherein said leg connecting member is of uniform thickness.

3. A true center wide drive for a motorcycle as in claim 1, wherein said offset pulley is adjustable by releasable locking means.

4. A true center wide drive for a motorcycle as in claim 1 wherein said motorcycle is a Harley Davidson Sportster™.

* * * * *